United States Patent [19]

Hampton, Jr.

[11] Patent Number: 4,655,357
[45] Date of Patent: Apr. 7, 1987

[54] ALL PURPOSE BIN

[76] Inventor: Garfield Hampton, Jr., 454 King St., Gary, Ind. 46406

[21] Appl. No.: 820,630

[22] Filed: Jan. 21, 1986

[51] Int. Cl.⁴ .............................................. B65D 90/00
[52] U.S. Cl. ...................................... 220/1.5; 220/19; 220/264; 220/335
[58] Field of Search ................ 220/1.5, 1 T, 260, 262, 220/263, 264, 334, 335, 19

[56] References Cited

U.S. PATENT DOCUMENTS

| | | | |
|---|---|---|---|
| 433,233 | 7/1890 | Byrom | 220/264 |
| 670,002 | 3/1901 | Murphy | 220/262 X |
| 3,072,452 | 1/1963 | Sleeper | 220/334 X |
| 3,883,026 | 5/1975 | Selz | 220/19 X |

Primary Examiner—Steven M. Pollard

[57] ABSTRACT

This bin is employed to store garbage, fruits and vegetables, feed, or cage animals, etc. Primarily, it consists of a wire meshed frame with a hinged door, and a cable mechanism is provided with a counter-balance weight, for keeping the door in open position, so as to enable the user's hands to be free when placing articles in or taking them out.

1 Claim, 3 Drawing Figures

ALL PURPOSE BIN

BACKGROUND OF THE INVENTION

1. Field of the Invention

This invention relates to storage devices, and more particularly, to an all purpose bin.

2. Description of Prior Art

Bins of the prior art are usually designed for specific purposes, and as such, are limited in utility. The all purpose bin in accordance with the present invention, will be employed for the storage of garbage, the caging of animals, the storage of fruits, vegetables, and even animal feed, etc.

The principal object of this invention is to provide an all purpose bin, which will be unique in design, as it may be employed for the convenient storage of garbage, the caging of animals, the storage of fruits and vegetables, animal feed, etc.

Another object of this invention is to provide an all purpose bin, which will be of such design, as to employ a pulley system for its door, enabling one to insert articles for storage, without having to use one's hands to hold the door of the structure up, as a counter-balance weight will be used for same.

SUMMARY OF THE INVENTION

Figure 1:
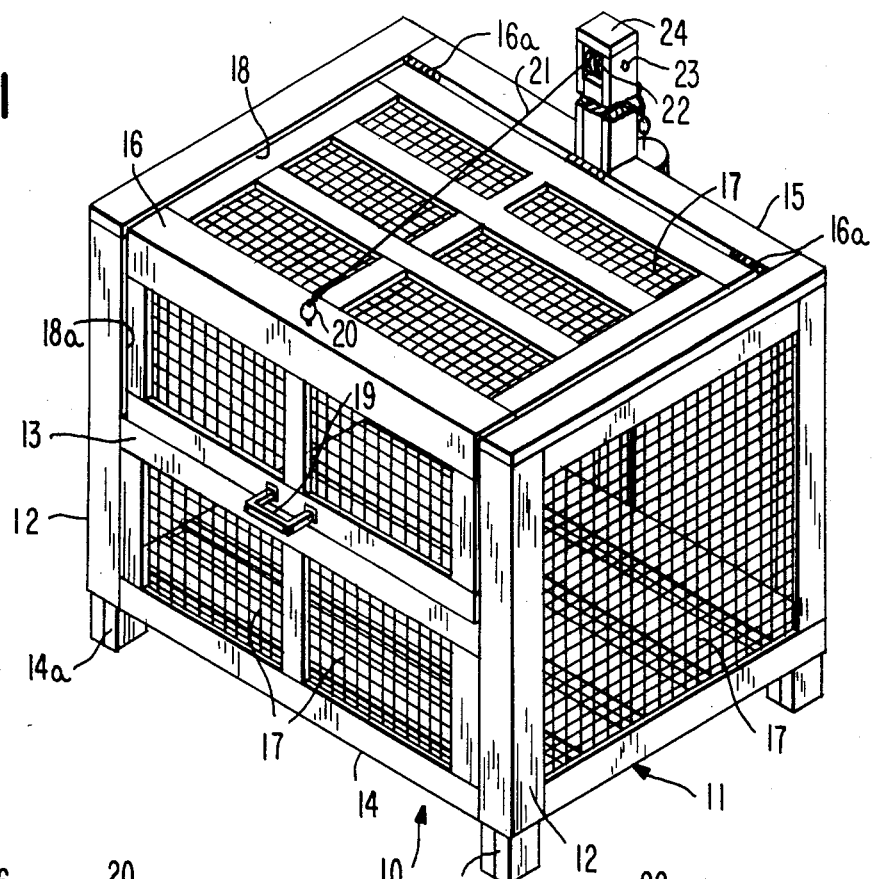
FIG. 1 is a perspective view of the present invention.
Figures 2, 3:
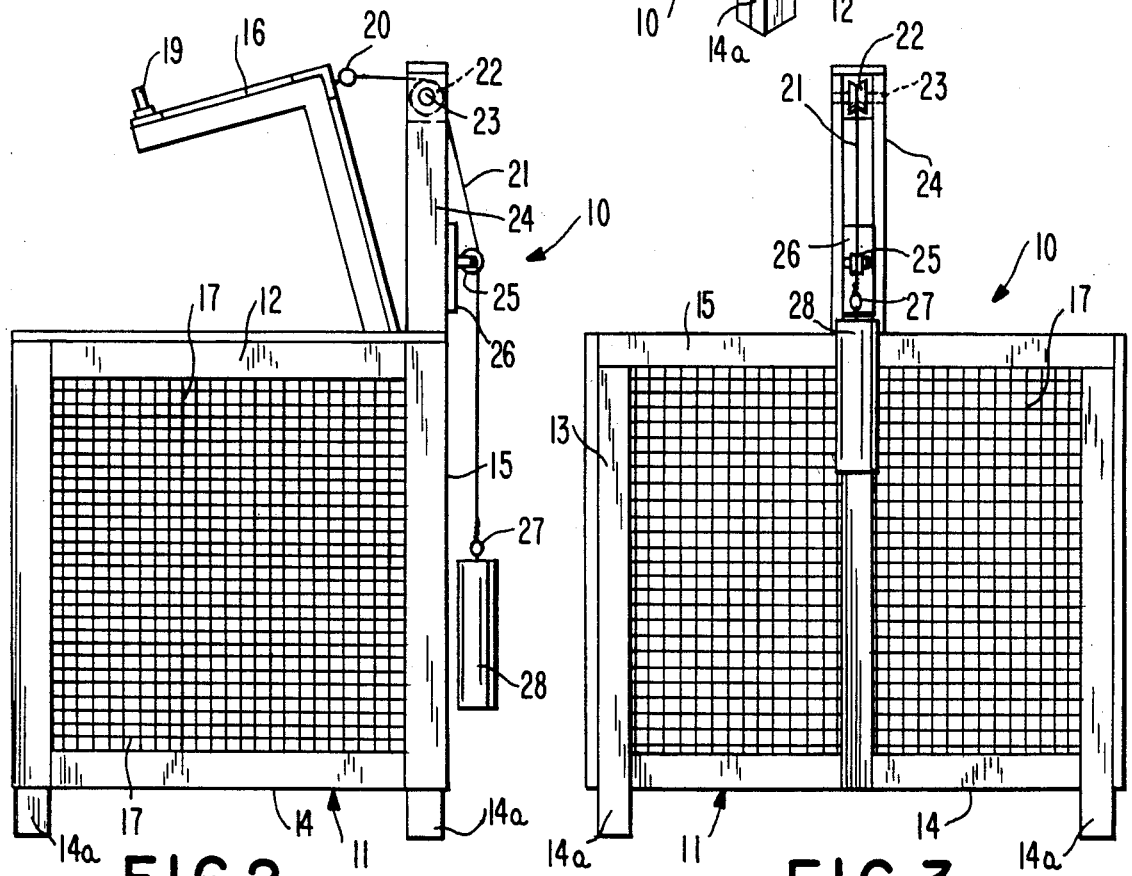
FIG. 2 is a side view of FIG. 1, shown in elevation and illustrating the door in open condition.
FIG. 3 is a rear view of FIG. 2; showing the door in closed condition.

An all purpose bin, comprising a frame with wire mesh sides and a door having a pulley system attached with a counter-balance weight, enabling one's hands to be free without holding the door up when inserting or removing articles therefrom.

DETAILED DESCRIPTION

Accordingly, a bin 10 is shown to include a frame 11 fabricated of steel or other suitable material. Frame 11 is provided with a pair of side walls 12, a front wall 13, a bottom wall 14 with legs 14a, and a rear wall 15. An "L"-shaped door 16 is hinged by hinges 16a to rear wall 15, and door 16, walls 12, 13, 14, and 15, have a wire mesh screen 17 suitably fixedly secured therein. Door 16 serves to cover top opening 18 and front opening 18a, and a handle 19 is suitably secured to door 16 for lifting and lowering door 16. An eye 20 is secured to the forward top portion of door 16, and a cable 21 is secured at one end to eye 20 and extends over a pulley 22 mounted on a shaft 23 secured within a vertical and hollow post 24 which is fixedly secured to the top portion of frame 11. Cable 21 also extends over a second pulley 25 mounted to a bracket 26 fixedly secured to the rear of post 24, and the other end of cable 21 is fastened to a second eye 27 secured to the top of a counter-balance weight 28, which serves to keep door 16 in the elevated position after it is lifted, enabling the user to have his hands free when placing articles in and taking articles out of bin 10.

In use, door 16 is lifted by grasping the handle 19, and when in the full upward position, the counter-balance weight 28 will keep door 16 elevated until the user desires to grasp handle 19 and pull door 16 closed against the weight of counter-balance weight 28, which will then be elevated to its normal at rest position.

It shall be noted, that the design of bin 10 is such, that garbage, fruits and vegetables, feed or whatever is placed therein, will remain intact, because it is foolproof against rodents, cats, dogs, and the wind. It further provides protection against flies and other insects when the lids are on cans and the bags therein, are tied.

It shall also be recognized, that it prevents picking up the same garbage twice after being dislodged by animals, as commonly occurs with other type devices, and the structure further prevents rodents from jumping out of garbage, as normally occurs with other type structures, when sanitation people pick up.

While various changes may be made in the detail construction, such changes will be within the spirit and scope of the present invention, as defined by the appended claims.

What I now claim is:

1. An all purpose bin, comprising, in combination, a three dimensionally rectangular frame including downwardly legs, a wire mesh screen affixed around said frame forming a ventilated enclosure within said frame, an "L"-shaped door pivotally hinged on said frame selectively closing an opening on the top and front side of said enclosure, said door comprising an "L"-shaped frame having wire mesh screen affixed thereto; a handle on a lower edge of the front side of said door, a hollow, upwardly post at the rear of said rectangular frame and a door-lifting mechanism supported on said post; said mechanism comprising an eye affixed on the front edge of the top of said door, one end of a cable attached to said eye, a first pulley supported pivotally free on an upper end of said post, a second pulley supported pivotally free at a lower portion of said post, said cable extending around said pullies and a suspended counterweight supported on an opposite end of said cable, and said first pulley being at a raised elevation approximately equal to said door eye when said door is in upwardly pivoted position.

* * * * *